TYPE II SUPERCONDUCTORS CONTAINING MAGNETIC PARTICLES

Filed Jan. 24, 1966

Inventors:
Thomas H. Alden;
James D. Livingston,
by Richard A. Speer
Their Attorney.

United States Patent Office 3,448,062
Patented June 3, 1969

3,448,062

TYPE II SUPERCONDUCTORS CONTAINING MAGNETIC PARTICLES

Thomas H. Alden, Schenectady, and James D. Livingston, Scotia, N.Y., assignors to General Electric Company, a corporation of New York Filed Jan. 24, 1966, Ser. No. 522,723
Int. Cl. H01b *1/02*
U.S. Cl. 252—513 3 Claims

ABSTRACT OF THE DISCLOSURE

A dispersed phase of magnetic particles such at metal ferrites, iron, cobalt, and nickel is provided in a type II superconductive matrix of a body so that the body will have directional response to applied magnetic fields or directional electrical conductivity.

This invention relates to superconductors and more particulraly to superconductors containing magnetic dispersions causing them to have directional magnetic or directional conductive properties.

It is now recognized that superconductive materials fall into two broad categories and are designated as type I or as type II superconductors depending principally upon whether the material in an increasing magnetic field passes from the superconductive state to the normal state abruptly or whether it passes through a "mixed state" in which superconductive and normal regions exit simultaneously. The former is characteristic of type I superconductors while the latter is characteristic of type II superconductors. Further, magnetic hysteresis and the associated current-carrying capacity of type II superconductors are believed to depend on the pinning of magnetic flux lines by internal defects.

It is a principal object of this invention to increase the current-carrying capacity of type II superconductors.

It is an additional object of this invention to produce type II superconductors with asymmetric properties; and It is a further object of this invention to provide a superconductor whose current-carrying properties in any direction can be varied over a range of values by varying the magnetic hysteresis of the superconducting body.

Other objects and advantages of this invention will be in part obvious and in part explained by reference to the accompanying specification and drawings.

Figure 1:
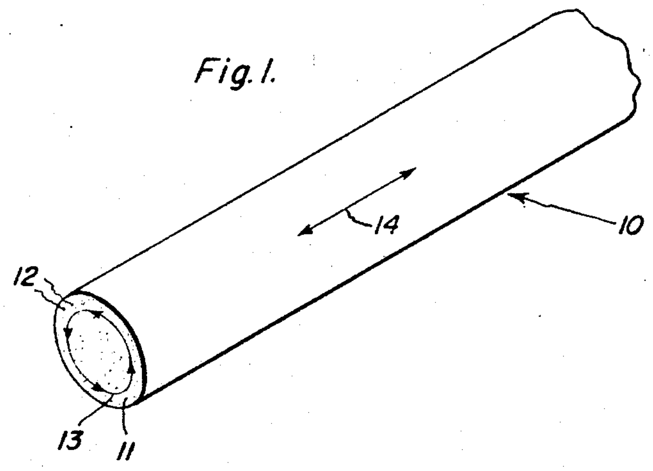
Figure 2:
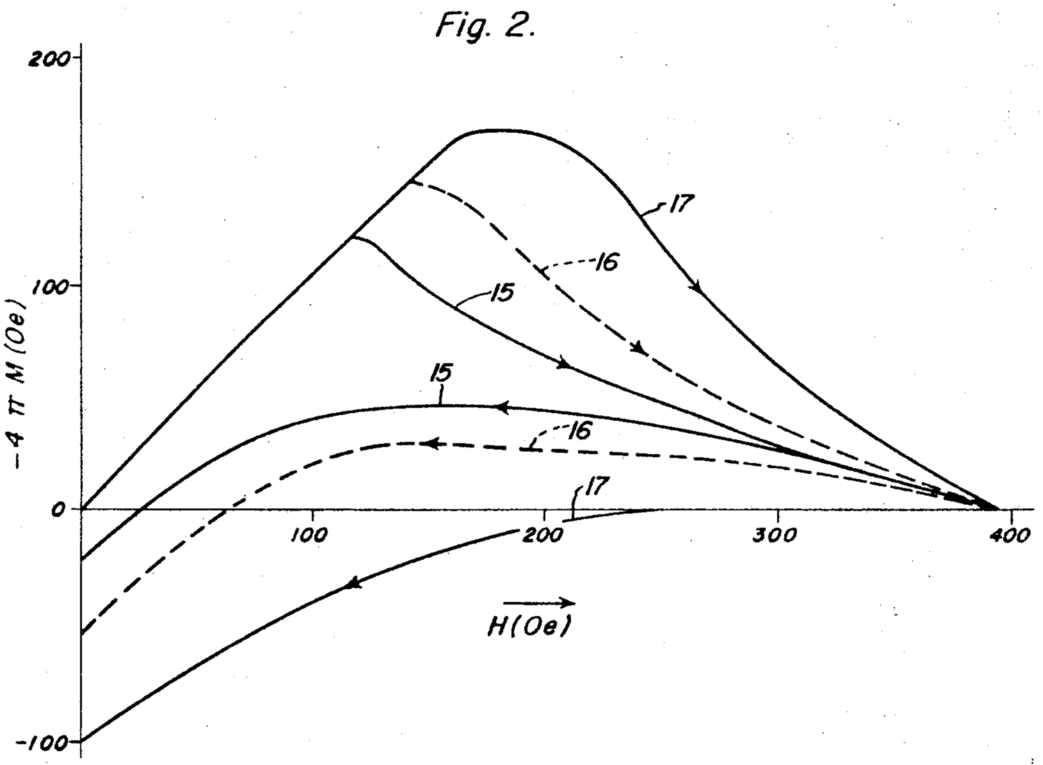

FIG. 1 is a partly enlarged perspective view of a model superconductor according to the invention; and FIG. 2 is a graph illustrating the magnetic hysteresis of a type II superconductor and a superconductor produced according to this invention.

Broadly, the type II superconductors of this invention have either directional response to applied magnetic fields or directional electrical conductivity and are made up of a matrix which is a type II superconductive material and a dispersion of magnetic particles present throughout the matrix. The particles are permanently magnetized in predetermined directions to deliver the directional magnetic or directional electrical properties desired.

Referring to FIG 1 of the drawings, there is shown a model superconductive body 10 which comprises a matrix 11, this matrix being a type II superconductive material. As was mentioned earlier, a type II superconductor is one which evidences a transition or intermediate condition ("mixed state") in changing from a superconductive to a normally conductive condition. In this "mixed state," the material is thought to contain regions of superconductive and normally conductive material. Generally speaking, all materials capable of being rendered superconductive, other than pure elements, exhibit such transitional behavior and are therefore type II superconuctors. For example, alloys or intermetallics such as Hg—In, $Nb_3Sn$, Nb—Zr, Pb—Bi, $V_3Ga$, etc. are representative of the wide diversity found in the many hundreds of type II superconductive materials now known.

Body 10 also includes a dispersion of fine particles which compositionally consists of a hard magnetic material, that is, one that can be permanently magnetized. These particles can obviously be made of alloys of the ferromagnetic metals (iron, nickel, cobalt and alloys thereof) and can also be of a ferrimagnetic composition. For example, such materials as the barium ferrites, titanates, or metaniobates, manganese, magnesium, nickel or cobalt ferrites, and lead metaniobates all constitute effective ferrimagnetic materials. The principal criterion that must be met is that the particles be capable of retaining a permanent moment, or remanent magnetization, following subjection to an imposed magnetic field. The particular dispersant utilized will depend upon the use to which the material is to be put, a higher degree of permanent magnetization being of value in some cases and a relatively lower permanent magnetic field being valuable in others.

Depending upon the magnetic history of the superconductor, i.e., the direction in which the magnetic field effecting magnetization of the dispersed particles is exerted, the body will exhibit either a direction of preferred conductivity or it will have a directional response to subsequently applied magnetic fields. Referring to FIG. 1, if a superconductor having directional electrical conductivity were being sought, then the body 10 would be subjected to a magnetic field in the direction of the path 13, concentric with the circumference of the body. With the imposition of a field with this circular direction (e.g., by a current pulse) the particles 12 in the body would, of course, be permanently magnetized in different directions depending upon the relative location within the body. Since current flowing parallel to the longitudinal axis of body 10 would generate a flux field traveling either in the identical direction as that created by the particles or traveling in the exact opposite direction, the current flow in one direction in body 10 will be greater than in the opposite direction. This result is felt to occur by virtue of the fact that a flux line approaching a particle magnetized in the opposite direction will be repelled by the return flux of the particle and thus will tend to by-pass the obstacles. On the other hand, a particle magnetization in the same direction will attract and pin the flux line, the energy of the system being lowered by eliminating the return flux and shortening the flux line.

If body 10 is to have directional response to an applied magnetic field, then the particles would be magnetized along the direction indicated by line 14. Bodies processed in this fashion can find application as switching devices.

To illustrate the invention, a type II superconductor compositionally consisting of mercury alloyed with 13 atomic percent indium and having a critical temperature of 3.5° K. was combined with spherical iron particles. A dispersion of about 1 percent concentration was made in the mercury by electrodeposition of iron from a ferrous sulfate solution into a stirred mercury cathode. Various particle sizes were produced by aging the amalgam at temperatures from room temperature to 175° C., the intrinsic coercive force of 77° K. being used to determine the resulting particle size. Following addition of 13 percent indium, samples of various iron concentrations were produced by dilution. Alloys were cast into chilled molds and samples ⅛ inch in diameter and ¾ inch long with rounded ends were prepared. All samples were annealed 15 hours or more at —20° C.±3° C. before measurement.

The alloys containing iron were first cooled to 4.2° K. A state of remanent or permanent magnetization was induced in the iron particles by applying and removing a field of 6000 oersteds, the sample then being cooled to the superconducting state in zero field. Magnetization curves to 400 oersteds and back to zero were then taken either parallel or anti-parallel to the remanent particle magnetization.

The effect of the particles can be seen by referring to FIG. 2 of the drawings where curves 15 show the hysteresis present in the mercury-indium alloy which contain no particles having remanent magnetization. Curves 16 and 17, on the other hand, indicate the presence of much greater magnetic hysteresis and in this instance approximately 0.02 percent permanently magnetized iron particles were present. The curve 16 illustrates the magnetic hysteresis present when the body was subjected to a field acting in opposition (anti-parallel) to the remanent field created by the dispersed iron particles. Curve 17 clearly indicates the greater flux pinning effect arising when the applied magnetic field is parallel to the direction of particle remanent magnetization. A corresponding difference in critical currents is also found in these materials so that the iron has produced a superconductor having directional properties which depend on the sense of the magnetic field applied to the body.

Significant sense-dependent hysteresis has been observed having particle diameters ranging from 40 to 200 A. (coercive force at 4.2° K. ranging from 180 oersteds to 1090 oersteds) and for iron volume fractions from 0.01 percent to 1 percent. Hysteresis is always greater for the parallel case than for the opposed or anti-parallel case, demonstrating that an attractive center is more effective in impeding the motion of flux lines than a repulsive center.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What we claim as new and desire to secure by Letters Patent of the United States is:

1. A superconductor having directional response to applied magnetic fields or directional electrical conductivity comprising a body including, (a) a matrix compositionally consisting of a type II superconductive material selected from the group consisting of Hg—In, $Nb_3Sn$, Nb—Zr, Pb—Bi and $V_3Ga$; and (b) a dispersion of magnetic particles throughout said matrix, said particles being permanently magnetized in predetermined directions to cause the directional properties in said superconductor and being selected from the group consisting of iron, nickel, cobalt and alloys thereof, and barium ferrites, barium titanates, barium metaniobates, lead metaniobates, manganese ferrites, magnesium ferrites and cobalt ferrites.

2. A body as defined in claim 1 wherein said matrix is $Nb_3Sn$ and the particles are permanently magnetized iron.

3. A body as defined in claim 1 wherein said particles are present in amounts ranging from 0.01 to about 1.0 volume percent.

References Cited

UNITED STATES PATENTS

| | | | |
|---|---|---|---|
| 2,970,961 | 2/1961 | Matthias | 252—62.55 |
| 2,989,480 | 6/1961 | Matthias | 252—62.55 |

OTHER REFERENCES

Zegler, "Physical Review," vol. 137, No. 5A, pp. 1438–40 (1965).

TOBIAS E. LEVOW, *Primary Examiner.*

J. COOPER, *Assistant Examiner.*

U.S. Cl. X.R.

252—62.55, 62.56, 62.63, 62.64, 512, 518, 519, 520